US007015412B1

(12) United States Patent
Uttrachi

(10) Patent No.: US 7,015,412 B1
(45) Date of Patent: Mar. 21, 2006

(54) WELDING SHIELDING GAS SAVER FLOW-CONTROL DEVICE

(76) Inventor: Gerald Daniel Uttrachi, 4313 Byrnes Blvd., Florence, SC (US) 29506-8310

( * ) Notice: Subject to any disclaimer, the term of this patent is extended or adjusted under 35 U.S.C. 154(b) by 13 days.

(21) Appl. No.: 10/972,866

(22) Filed: Oct. 22, 2004

(51) Int. Cl.
*B23K 35/38* (2006.01)

(52) U.S. Cl. .......................................... 219/74; 219/75

(58) Field of Classification Search .................. 219/74, 219/75; 228/219
See application file for complete search history.

(56) References Cited

U.S. PATENT DOCUMENTS

| | | | | |
|---|---|---|---|---|
| 3,275,796 | A | 9/1966 | Bernard et al. | |
| 3,811,027 | A * | 5/1974 | Strahan | 219/74 |
| 4,278,864 | A * | 7/1981 | De Facci et al. | 219/75 |
| 4,341,237 | A | 7/1982 | Stauffer | |
| 6,390,134 | B1 | 5/2002 | Hanby | |
| 6,610,957 | B1 | 8/2003 | Uttrachi | |
| 2003/0019845 | A1* | 1/2003 | Uttrachi | 219/74 |

OTHER PUBLICATIONS

Weber, "How to save 20% on Welding Costs," Trailer/Body Builders Mag, Jan. 2003, p. 46, col. 3,PRIMEDIA, Overland Park, Kansas.

Standlfer, "Shielding GasConsumtion Efficiency," The Fabricator Mag., Jun. 2000, p. 27, col. 2 & 3, The Croydon Group, Rockford, Illinois.

* cited by examiner

*Primary Examiner*—Jonathan Johnson
*Assistant Examiner*—R E Beveridge

(57) ABSTRACT

This device significantly reduces a major reason for shielding gas waste in MIG welding. When welding is stopped, excess gas is stored in the hose transporting shielding gas to the solenoid located in a welding system. At subsequent weld starts, this stored gas creates a high surge flow wasting gas. Prior methods employed to reduce gas waste at the weld start have been complex, subject to leaks, were not sufficiently robust for the environment, did not provide shielding gas savings for welds longer than 3 to 4 seconds, were useful for limited delivery hose lengths or reduced the self compensating flow features inherent in higher delivery pressure systems. The device includes a compact variable flow-control that is inserted in a shielding gas delivery hose at a predetermined distance from the solenoid end to reduce gas waste and provide a controlled amount of extra gas at the weld start.

8 Claims, 4 Drawing Sheets

WELDING SHIELDING GAS SAVER FLOW-CONTROL DEVICE

BACKGROUND

1. Field of Invention

This invention relates to savings up to 50% or more of shielding gas in the MIG welding process while improving weld start quality.

Gas metal arc welding (GMAW) is commonly referred to as metal inert gas welding (MIG). The term MIG welding is used in this document. In the MIG welding process molten metal is produced by an electric arc. A welding wire is fed into the arc zone by a feeding mechanism. A suitable power source is connected between the workpiece to be welded and to the welding wire passing though a welding torch. Welding power, welding wire, and shielding gas are usually transported through the torch. The welding torch is usually attached to a flexible cable assemble and is manipulated by the welding operator. Molten metal comprising the weld is derived from the materials to be welded and the welding wire. The molten weld metal is protected from the surrounding air by a shielding gas. The welding wire is melted into droplets most of which are transported to the weld puddle and solidify into the weld. However about 2 % to 4% of the droplets are expelled from the weld zone and are referred to as weld spatter.

The shielding gas employed to protect the molten metal formed by the electric arc can be a number of gases such as argon, carbon dioxide, and helium. Mixtures of these and small amounts of other gases are employed to provide the desired welding performance. Shielding gas is supplied from a pipeline or a high-pressure cylinder. Fabricating shops with a large number of MIG welders often have the shielding gas distributed to the welding area through a pipeline from a centrally located gas source. From the pipeline it is usually delivered to each welding machine though a flexible shielding gas delivery hose. In an application such as a shipyard, the shielding gas delivery hose may be in excess of 30 m (100 feet) long. Pipeline pressures are often set at 345 kilopascal, kPa (50 pounds per square inch, psi) or higher. When high pressure cylinders are employed for the gas supply a regulator is used with a preset output of 172 kPa (25 psi, pounds per square inch), 207 kPa (30 psi), or in some common regulators 345 kPa (50 psi). The output pressure level of the regulator is dependent on the manufacturer and model. For MIG systems using carbon dioxide as a shielding gas supplied in cylinders, it is common to employ a regulator with 550 kPa (80 psi) output. This higher outlet pressure reduces the possible formation of ice crystals in the regulator/flow-control system as the carbon dioxide gas pressure is reduced from that in the cylinder. For each welding system a variable flow-control valve or suitable flow-control device is usually located at the pipeline supply or incorporated immediately after the regulator. This flow-control device allows adjustment of the shielding gas flow to the appropriate rate needed for welding. A flow measurement gauge may be included as part of the flow control system.

It is most common for the hose used to deliver the shielding gas from the flow-control device at the gas pipeline or cylinder to the welding machine or wire-feeding device to be 6.4 mm (¼ inch) in internal diameter. This hose may be longer than 30 m (100 feet) for some applications. To turn the flow of shielding gas on and off in commercial MIG welding systems, it is common to employ an electrically operated gas solenoid in the wire feeder or welding machine. When welding is started, usually by means of an electrical switch on the welding torch, the gas solenoid is opened allowing shielding gas to flow through the welding torch to the weld zone. The electrical switch may simultaneously engage the wire feed mechanism and power source.

In most systems, the flow of shielding gas is controlled by a flow-control device adjusted to achieve the desired shielding gas flow. It is common for this flow to be set from 9.4 Liters per minute, L/min (20 cubic feet per hour, CFH) to 19 L/min (40 CFH). Gas flows rates much in excess of this level can cause turbulence in the shielding gas stream as it exits the welding torch. This turbulence allows the surrounding air to be aspirated into the gas-shielding stream, degrading weld performance. In many systems, the gas pressure needed at the gas solenoid to provide the proper flow of shielding gas is less than 35 to 70 kPa (5 to 10 psi). This pressure requirement will vary somewhat as welding is performed and restrictions occur in the welding torch cable as it is bent and twisted during operation. The pressure requirements will also increase as weld spatter builds up in the welding torch shielding gas nozzle and gas passages in the front portion of the torch. If properly designed the gas supply system will automatically compensate for these restrictions and maintain the shielding gas flow at the preset value.

While welding, the gas solenoid valve is open, and the pressure in the gas delivery hose is only that needed to establish and maintain the desired flow. The flow-control device located at the gas source is set for the desired shielding gas flow rate and indirectly establishes this pressure. The system may incorporate a flow-measuring gauge. Portable flow-control gauges are also available. The portable gauge is put over the end of the torch shielding gas nozzle with the wire feed mechanism temporarily disengaged. While reading the gas flow on the gauge, the proper shielding gas flow is set by adjusting the flow-control device. When welding commences the pressure in the gas delivery hose near the solenoid is typically less than 35 to 70 kPa (5 to 10 psi) depending on the torch type, length, and plumbing restrictions. When welding is stopped the solenoid closes and flow of shielding gas from the solenoid to the torch stops. However, the gas flow continues to flow though typical flow control devices employed and fills the gas delivery hose until the gas pressure in the hose reaches the pressure in the pipeline or that pressure set by the regulator if present. The pressure in the gas delivery hose than rises from what was needed to establish the proper flow level to the outlet pressure in the pipeline or that set by the regulator. The excess pressure stores shielding gas in the gas delivery hose connecting the flow-control device to the welding machine or wire feeder until the solenoid is opened at the start of the next weld. When welding is restarted, this excess shielding gas is expelled very rapidly, often within less than about 1 to 3 seconds.

Depending on the number of starts and stops versus the overall welding time, wasted shielding gas can exceed 50% of the total gas usage. An article in the June 2000 Fabricator Magazine entitled "Shielding Gas Consumption Efficiency," page 27, col. 2 & 3 sites the fact that most shops are using from about two to over ten times more gas than is possible. In the same article a significant waste is described (page 29, Col. 3 & 4) as attributable to the storage of excess shielding gas in a commonly employed 6.4 mm (¼ inch) inside diameter shielding gas delivery hose. A more recent article was published in the January 2003 issue of Trailer Body Builders Magazine entitled "How to Save 20% on Welding Costs." On page 46 col. 3 of this article a representative from a leading manufacturer of shielding gases is quoted as saying, "A minimum of 142 Liters, L (five cubic feet) of gas is required to weld 0.45 kg (one pound) of wire, but the industry average usage is 850 L (30 cubic feet)." Since it is very unusual to need more than 225 to 280 L (8 to 10 cubic feet) of shielding gas per 0.45 kg (pound) of wire this statement means the average user consumes from three to six times the amount of shielding gas theoretically needed. Using the lower 3 times usage value and estimating the average retail price and annual volume; American consumers are wasting over 500 million dollars annually in shielding gas employed for MIG welding. Very high shielding gas surge flow rates at the weld start can momentarily reach in excess of 95 L/min (200 CFH). This flow rate is much higher desirable for good weld start quality. Weld start quality is degraded because excess shielding gas flow rate creates air aspiration in the shielding gas stream. Bernard, in U.S. Pat. No. 3,275,796 (1966) col. 5, 46 to col. 5, 49 states; "The system described provides a purging of the weld area where the arc is to be established by a strong blast of shielding gas to remove rust, dirt, and slag particles before the arc is established." In tests it was found that the excess shielding gas flow rate at the start is inconsequential in performing the tasks defined by Bernard. In addition the excess flow rate and resulting turbulence in the shielding gas stream can create internal weld start porosity and excess spatter.

2. Description of Prior Art

There have been devices sold which provide solutions to the problem of excess gas surge at the weld start:

(a) One device designed to reduce shielding gas loss at the weld start is described by Stauffer in U.S. Pat. No. 4,341,237 (1982). This device is of complex construction involving several mechanical elements and a surge tank to store and control this excess shielding gas. The numerous internal connections create the potential for leaks. The device incorporates a low pressure regulator to reduce gas waste and the surge storage tank is placed after the low pressure regulator. The surge tank designed to provide additional shielding gas at the weld start is large in size. Gas storage and extra gas supply at the weld start can only exist if the gas pressure in the storage device is higher than that needed while welding. The extra gas available for the weld start deliverable from this storage device must therefore rely on a regulator pressure which is higher than that needed to supply the desired flow of shielding gas while welding. If the device is to be effective in reducing shielding gas waste the pressure set by the regulator must be substantially lower than that in the incoming gas delivery line as is stated in the patent. Thus, the surge tank in the device described must be large since the extra gas available is proportional to the pressure differential between the pressure set at the regulator and that pressure needed to create the desired gas flow while welding. The practical implementation of a device labeled as being built under this patent contains a storage device which is relatively large.

In addition, if the shielding gas pressure is set at a substantially lower pressure than the gas delivery line there is little extra pressure available to compensate for restrictions which occur in the welding torch cable due to twisting and bending while welding. There is also little extra pressure to compensate and maintain the preset flow when weld spatter accumulates in the torch gas nozzle and/or blocks the torch gas passages at the nozzle end. Measurements made with a device employing this type of low pressure regulator design showed preset gas flow reduced about 20% when simulating spatter blockage in the weld torch. This is one of the reasons gas delivery systems were designed to operate at higher pressures. These higher pressure systems employ the principle of gas flowing though a critical orifice reaching a limiting velocity based on the orifice size and the pressure upstream of the orifice. The pressure downstream of the orifice will have little or no influence on the flow rate as long as that pressure is less than about one half of the upstream pressure. A gas delivery system designed to utilize higher pressure is referred to as a self compensating system.

Some simple low pressure devices have been used to reduce gas waste. However some of these devices provide no extra shielding gas at the weld start causing porosity due to air that enters the torch shielding gas cup, torch body, and torch cable when welding is stopped. Also the lack of extra gas pressure at the solenoid does not provide compensation for restrictions that occur in the torch body due to spatter build-up causing variations in shielding gas flow while welding.

(b) Another method occasionally used to reduce gas surge upon the initiation of welding is to incorporate a flow-control orifice at the solenoid end of the shielding gas delivery hose. This device is sometimes sold with the intent to reduce gas waste. The device can give the perception that gas waste is significantly reduced since the momentary high gas flow surge at the start of welding is reduced, however the gas waste may still occur. The orifice size is often selected to restrict gas flow at the weld start but not steady state gas flow while welding. Depending on the delivery pressure of the regulator these devices can employ very small orifices, as small as about 0.8 mm (0.032 inches). However, the orifice size is usually set to control the transient weld start gas flow rate well above that desired for steady state welding. This is necessary since differing welding torches, torch lengths, and internal plumbing restrictions require differing pressures at the solenoid to obtain the desired gas flow through the torch. Also it is often desirable to allow the shielding gas flow rate to be adjusted by the welding operator during production to compensate for drafts in the weld area or the type of weld joint. When the orifice size selected is larger than needed to control the shielding gas flow while welding, gas pressure in the shielding gas delivery hose at the solenoid valve end while welding reduces to that needed to obtain the desired flow.

Some torches and systems require about 35 kPa (5 psi) gas pressure at the solenoid to provide the desired flow. This is significantly lower than the pipeline or regulator fixed output pressure. When welding is stopped the gas solenoid closes and the pressure in the shielding gas delivery hose increases to the pipeline supply pressure. This pressure is often 345 kPa (50 psi) or higher or the delivery pressure of the regulator, i.e. 172 kPa (25 psi), 207 kPa (30 psi), 345 kPa (50 psi), or 550 kPa (80 psi). Once welding commences after several seconds, the flow rate reduces to the lower level set at the flow-control device near the gas source. Therefore, the pressure in the welding gas delivery hose near the solenoid end reduces to the level needed to achieve the desired flow, perhaps 35 kPa (5 psi). Experiments show, once the solenoid valve is open at the start of welding, even when a typical flow-restriction orifice is used in the system, a majority of the excess gas stored in the shielding gas delivery hose passes through the torch in about 3 to 5 seconds or less. Therefore, if the weld occurs for more than about 3 to 5 seconds in time, a similar amount of excess shielding gas is lost as if the restriction orifice was not present. The loss takes longer to occur, perhaps about 3 to 5 seconds, but it occurs. In addition, if the orifice were sized to restrict flow to exactly that needed for the desired flow there would be no extra shielding gas available at the start. It is desirable to have some extra shielding gas at the weld start to purge the torch system of air. Air will enter into the torch gas nozzle, torch body and torch cable when welding is stopped.

The phenomenon of a surge flow restrictor not significantly reducing shielding gas waste is not well understood. The reduction in gas surge the restrictor provides gives the perception that the waste is eliminated or significantly reduced. Hanby in U.S. Pat. No. 6,390,134, 2002 defines the use of restrictors to control shielding gas flow. Hanby states, col. 1, 33, "Gas-surge wastes valuable inert welding gas." Hanby subsequently states in col. 2, 7 to col. 2, 9, "Gas-flow may be set to any level below the maximum threshold by adjusting the flowmeter, just as in normal welding operation." This gives the impression that a significant savings in gas waste will exist with this approach or use of the claimed product, which it will not! Uttrachi in U.S. Pat. No. 6,610,957 (2003) defines the situation properly, namely col. 3, 37 to col. 3, 40; "Orifice restriction devices help reduce high flow gas surge at the weld start and the resulting degradation of the weld but often do not eliminate or significantly reduce shielding gas waste."

(c) Another method of reducing shielding gas waste is obtained by decreasing the volume of shielding gas stored in the delivery hose. Assuming a given length hose is needed to achieve the desired welding machine configuration, the other dimension controlling the volume in the shielding gas delivery hose is the internal cross sectional area. Uttrachi in U.S. Pat. No. 6,610,957 (2003) defines the use of a small inside diameter shielding gas hose with the addition of a surge restricting orifice at the gas solenoid end of the shielding gas delivery hose to limit gas surge at the weld start to improve the quality of weld starts. This system reduces shielding gas waste, but may have excess pressure drop for very long shielding gas delivery hose lengths. This excess pressure drop may limit the gas flow attainable below desired levels.

SUMMARY, OBJECTS AND ADVANTAGES

The principle object of this shielding gas control mechanism is to provide a means of delivering shielding gas to a MIG welding machine from a gas source such as a pipeline or a high-pressure cylinder. The gas delivery system provides a controlled amount of storage of shielding gas when welding is stopped. The stored gas volume is established to displace air that enters the welding torch cable, welding torch body, and welding torch shielding gas nozzle when welding is stopped. The stored gas is also quickly supplied in the weld start area when welding is initiated. To achieve reduced gas waste a compact shielding gas flow-control device is located in the shielding gas delivery hose. This gas flow-control device is inserted at a distance from the wire feeder solenoid such that there is a predetermined volume of gas stored in the gas passage between the variable flow-control and the solenoid. One type of such a device is a simple needle valve. Standard welding systems employ flow control devices that are bulky and fragile requiring them to be mounted in a safe location such as on or near the gas supply or rarely at the wire feeder where they require mechanical protection. The shielding gas hose is often subject to extensive abuse as the wire feeder is moved by the welder from place to place during production. In environments such as in a shipyard, the wire feeder is often placed on the ground near the part to be welded. The shielding gas delivery hose, often along with the welding power cable, is frequently dragged over the ground and other obstacles. The inspiration to mount the variable flow-control device in the shielding gas delivery hose required unorthodox thought as well as a vision of providing a compact, rugged design unlike those currently in use.

The features and placement of the variable flow-control device avoids wasted shielding gas each time welding is initiated regardless of the length of the shielding gas delivery hose. This system can be used on most industrial MIG welders to obtain significant savings in shielding gas usage. It is particularly useful when a long shielding gas delivery hose is employed. It can be readily added to an existing installation as well as incorporated in new systems. Flow adjustments are made at the variable flow-control device which is often much closer and therefore more convenient for the welder to access than typical flow control devices mounted near the gas supply. This gas delivery system maintains the typical high system gas pressure providing automatic flow rate compensation to correct for restrictions which occur in the shielding gas delivery hose as well in the welding torch cable, body, gas ports, and torch nozzle.

Another embodiment of this gas delivery system includes a surge restricting orifice placed near the gas solenoid to limit the shielding gas surge rate at the weld start. This prevents air from being aspirated into the shielding gas stream and improves weld start quality.

A further embodiment includes a novel method of employing an electronic technique for measuring gas flow. This device can be of a rugged design allowing it to be incorporated with the variable flow-control device that is mounted in the gas delivery hose. The electronic flow measuring device can be mounted at the wire feeder if desired. Flowmeters and flow controls used in the welding industry typically consist of plastic rotameter flow tubes or large, fragile flow calibrated pressure gauges employing bourdon tube construction. These devices are bulky and somewhat fragile reinforcing the paradigm that they must be installed in an area where they can be accommodated and protected from the normal welding environment. The electronic flow-control device could measure pressure and be calibrated to read flow. A pressure differential measuring device calibrated to read flow volume or a hot wire anemometer type measuring device might be employed. The pressure measurement design could be similar in concept to those devices used in very compact digital tire pressure gauges. The use of a combined variable flow-control device with a compact flow measurement device avoids the need for any other mechanism to measure and adjust flow. The shielding gas delivery hose can thus be connected directly to the gas supply pipeline, through a required gas shut off, with no other gas flow control or flow measurement device needed.

DRAWING FIGURES

FIG. 1 schematically represents a typical MIG welding system also including a compact variable flow-control element and showing the location of that device.

DESCRIPTION

Main Embodiment

Figure 1:
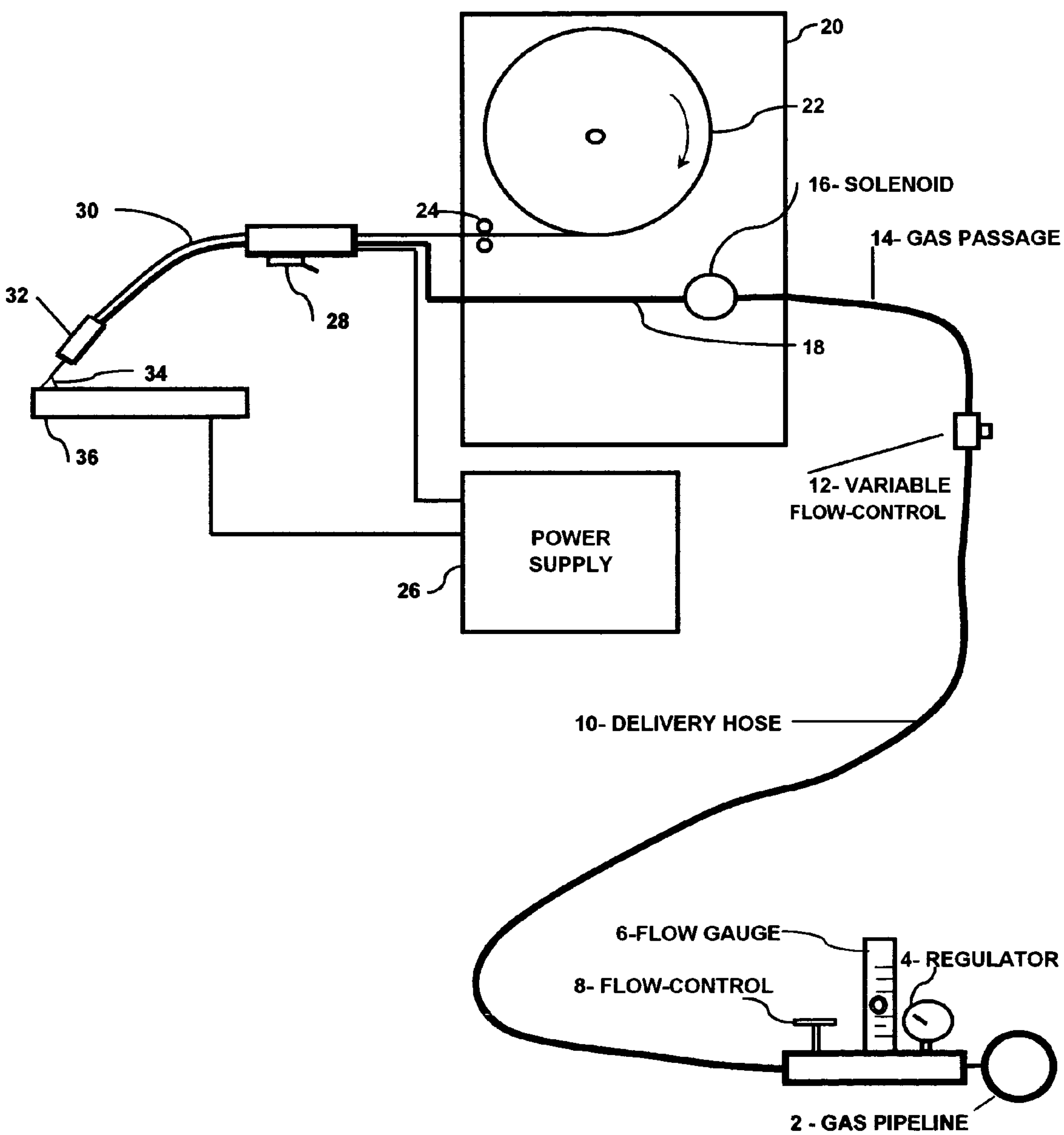

FIG. 1 illustrates a typical MIG welding system with the inclusion of a variable flow-control 12 device. Shielding gas is often supplied in a gas pipeline 2 or in a conventional high pressure cylinder (not shown). A flow-control 8 device is often incorporated between a gas pipeline 2 and a gas delivery hose 10. A rotameter flow gauge 6 may be incorporated with the flow-control 8 device. When shielding gas is supplied in a cylinder a regulator 4 is employed to lower the gas pressure for delivery to the welder. The regulator 4 often includes a flow-gauge 6 measuring device. Gas pipeline 2 often operates at about 345 kPa (50 psi) and often does not require a regulator 4. However a regulator 4 can be used if the pipeline pressure is high or not consistent. A flexible shielding gas delivery hose 10 is employed to convey the shielding gas from the gas source to the welding machine. In a conventional system the shielding gas delivery hose 10 is commonly connected directly to an electrically operated solenoid 16 used to control the gas flow off and on. This gas solenoid 16 is incorporated in or near the welding wire feed system 20. A torch switch 28 is usually utilized to activate the gas solenoid 16, the wire feed mechanism 24, and the power source 26. This wire feed system 20 usually contains a wire spool 22. The shielding gas is delivered from the solenoid 16 through a gas passage 18 to the welding torch 30. The welding torch 30 has affixed to the end a shielding gas nozzle 32 that directs the shielding gas stream to protect the weld area from the surrounding air. The welding power source 26 may be integral with the wire feed system 20 or separate. The welding power and welding wire are also transported to the welding torch 30. The shielding gas, welding wire, and welding power form an arc 34 at the workpiece 36. To reduce shielding gas waste a variable flow-control device 12 is inserted into the delivery hose 10 at a specific distance from the solenoid end. This allows the storage of extra shielding gas in gas passage 14 when welding is stopped. When welding is started this stored gas will be delivered through the shielding gas nozzle 32 and provides a predetermined amount of extra shielding gas to the weld area. A preferred distance for the location of the variable flow-control device 12 for the typical 6.4 mm (¼ inch) inside diameter delivery hose 10, has been defined to be from about 0.45 m (1.75 feet) to 2.6 m (8.5 feet) depending on system pressure and desired extra gas flow at the weld start. Since the inside diameter of the gas hose can vary from the 6.4 mm (¼ inch) dimension the predetermined amount of storage can be defined in terms of the mechanical volume of gas passage 14. That translates to a volume of from about 0.017 L (1 cubic inch) to 0.084 L (5 cubic inches) in gas passage 14. This variable flow-control 12 device can be utilized in an installation with an existing flow-control device 8. This is accomplished by simply adjusting the flow-control 8 device so its flow setting is at maximum or significantly higher than the flow set by the variable flow-control 12. If the flow-control 8 has included a rotameter type flow gauge 6 it will still read the gas flow accurately.

OPERATION

Main Embodiment

Referring to FIG. 1. When welding is initiated, usually by closing the torch switch 28, the gas solenoid 16 is opened. Shielding gas flows from a gas pipeline 2, through a regulator 4 if present, though a flow measuring device 6, if present, to a flow-control 8 device, if present. If the flow-control 8 device is present it is adjusted to its maximum flow capacity allowing shielding gas to pass though to the flexible shielding gas delivery hose 10. Gas flows to a variable flow-control 12 device. The gas pressure in the delivery hose 10 will essentially be the gas pipeline 2 pressure or that established by the regulator 4. Variable flow-control 12 is adjusted to establish the desired gas flow while welding. Gas flow continues through gas passage 14 and through open solenoid 16 to welding torch 30 and torch nozzle 32. The gas pressure in the gas passage 14 is established by the restriction created by the variable flow-control 12 device. The shielding gas, welding wire, and welding power come together to form an arc 34 and the workpiece 36. The welding wire is melted into droplets in the arc most of which form the weld. However from 2% to 4% of the droplets are expelled from the weld area and are referred to as weld spatter.

When welding is stopped the solenoid 16 closes however shielding gas continues to flow into the gas passage 14 until the pressure raises to that of the gas pipeline 2 or that pressure established by regulator 4 if present. When welding is restarted the excess gas pressure in the gas passage 14 over that needed to produce the desired shielding gas flow rate is rapidly reduced to that governed by the variable flow-control 12 device. This produces a shielding gas flow rate in excess of that preset by variable flow-control 12 for the time it takes for the excess gas to leave the gas passage 14. A predetermined amount of the extra gas is desirable to quickly purge air from the torch system that enters during the period when the weld was stopped. The extra gas also provides a means of quickly displacing the air in the weld start area. This controlled amount of extra gas significantly reduces the gas waste that normally results when the full volume of gas delivery hose 10 stores extra gas.

If no flow measuring device is included in the welding system, a portable flow measuring device (not shown) can be put over the torch nozzle 32, with the wire feed mechanism 24 disconnected so as to not feed wire, and the torch switch 28 activated to turn on the gas solenoid 16. The desired gas flow would then be set on the variable flow-control 12 device.

Figure 2:
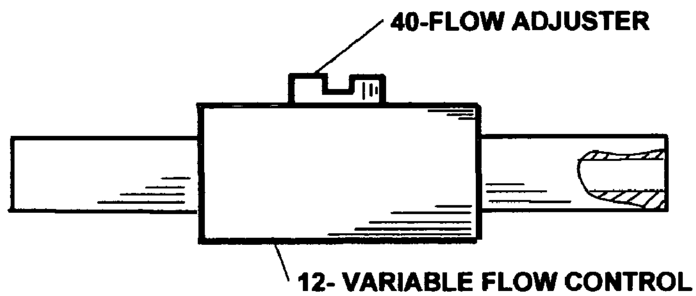
FIG. 2 is a representation of the compact variable flow-control device which is inserted in the shielding gas delivery hose and is used to set the welding shielding gas flow rate.

FIG. 2 shows the compact variable control-flow 12 device used to set the welding gas flow rate. The representation of the flow adjuster 40 shows the possible use of a tool, such as a screwdriver, may be desirable to make flow adjustments. This avoids the adjustment being inadvertently altered while the device is dragged across the workplace during production. It is also possible to recess the flow adjuster 40 and require the use of a hex wrench or similar device to achieve the objective of avoiding inadvertent changes in flow rate. Another possible flow adjuster 40 design could utilize a special shaped coded wrench (not shown) if it is desired to allow only a supervisor to make flow adjustments. It is also possible to include a filter (not shown) on the gas inlet side of the variable flow-control 12 device to prevent debris from entering the gas passages.

DESCRIPTION AND OPERATION

Additional Embodiments

Figure 3:
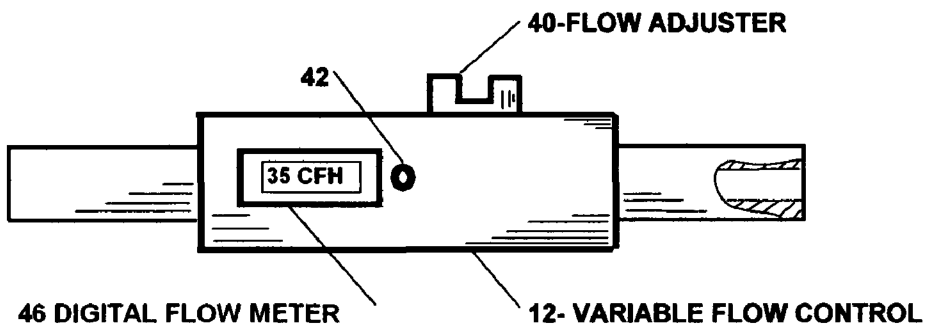
FIG. 3 is a representation of the variable flow-control device employed to set the welding shielding gas flow rate in combination with a similarly compact digital flow measuring device.

Referring to FIG. 3, the variable control-flow 12 device is shown schematically in combination with a similarly compact digital flow meter 46 device. A button 42 or similar means can be used to activate the digital flow meter 46 device. Since measuring flow need only be done periodically, digital flow meter 46 device can be powered by a small battery. The advantage of this arrangement is the flow measuring device can be in the same proximity as the variable control-flow 12 device. This arrangement can also preclude the need for any other flow measuring device. For example this would allow the shielding gas delivery hose 10 in FIG. 1 to be connected directly to the gas pipeline 2 in FIG. 1.

Figure 4:
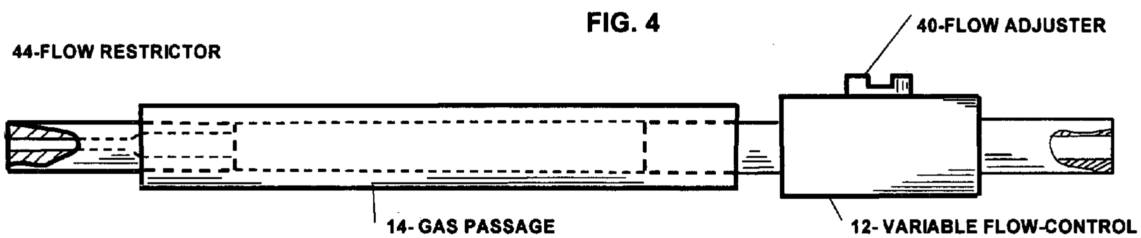
FIG. 4 is a representation of the compact variable flow-control device in combination with the gas passage to the solenoid including a flow restrictor in the form of a hose splice connection.

Referring to FIG. 4, the variable control-flow 12 device is shown schematically in combination with the gas passage 14 that connects a flow restrictor 44 in the form of a hose splice which connects to the solenoid 16 in FIG. 1. As noted in FIG. 4 the flow restrictor 44 is included to limit the surge flow at the start of the weld. Since the gas stored in gas passage 14 when welding is stopped is at a relatively high pressure, perhaps up to 550 kPa (80 psi) depending on the system, shielding gas can exit the shielding gas nozzle 32 in FIG. 1, at a rate in excess of 70 L/min (150 CFH). This high gas flow rate is sufficient to cause air to be aspirated into the shielding gas stream creating poor weld starts and excess weld spatter. By employing a flow restrictor 44 after the gas passage 14 the gas flow at the weld start can be limited to a maximum predetermined level. The size of the flow restrictor 44 is selected so as not to limit flow in the usable range while welding which flow is established by the variable flow-control 12 device.

Figure 5:
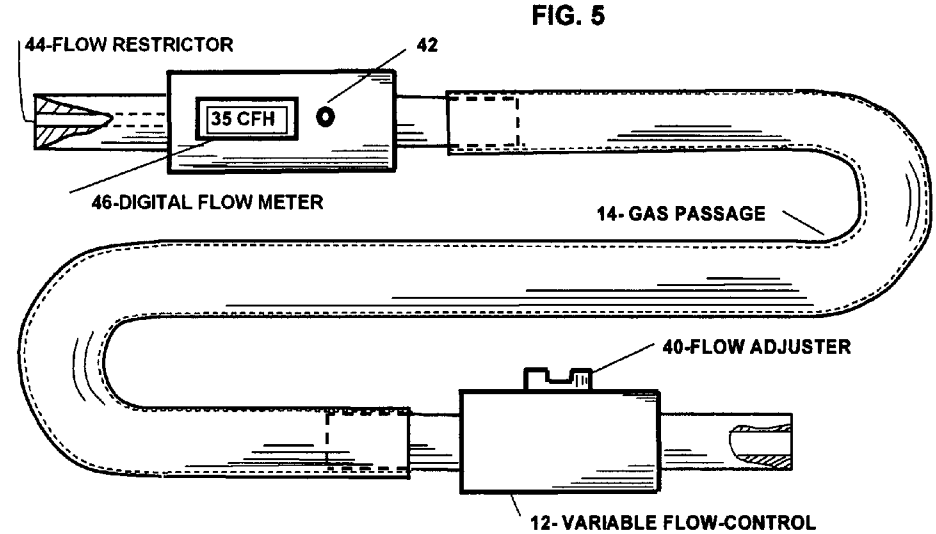
FIG. 5 is a representation of the compact variable flow-control device with the gas passage to the solenoid including a digital flow measuring device combined with a flow restrictor in the form of a hose splice connection.

Referring to FIG. 5, the compact variable control-flow 12 device is shown with the gas passage 14 and a digital flow meter 46 combined with a flow restrictor 44 in the form of a hose splice connection. In this configuration the digital flow meter 44 device does not require the same degree of ruggedness as when it is combined with the variable control-flow 12 device as defined in other embodiments. It is also close to the wire feeder 20 in FIG. 1, which has electrical power readily available should that be needed.

Figure 6:
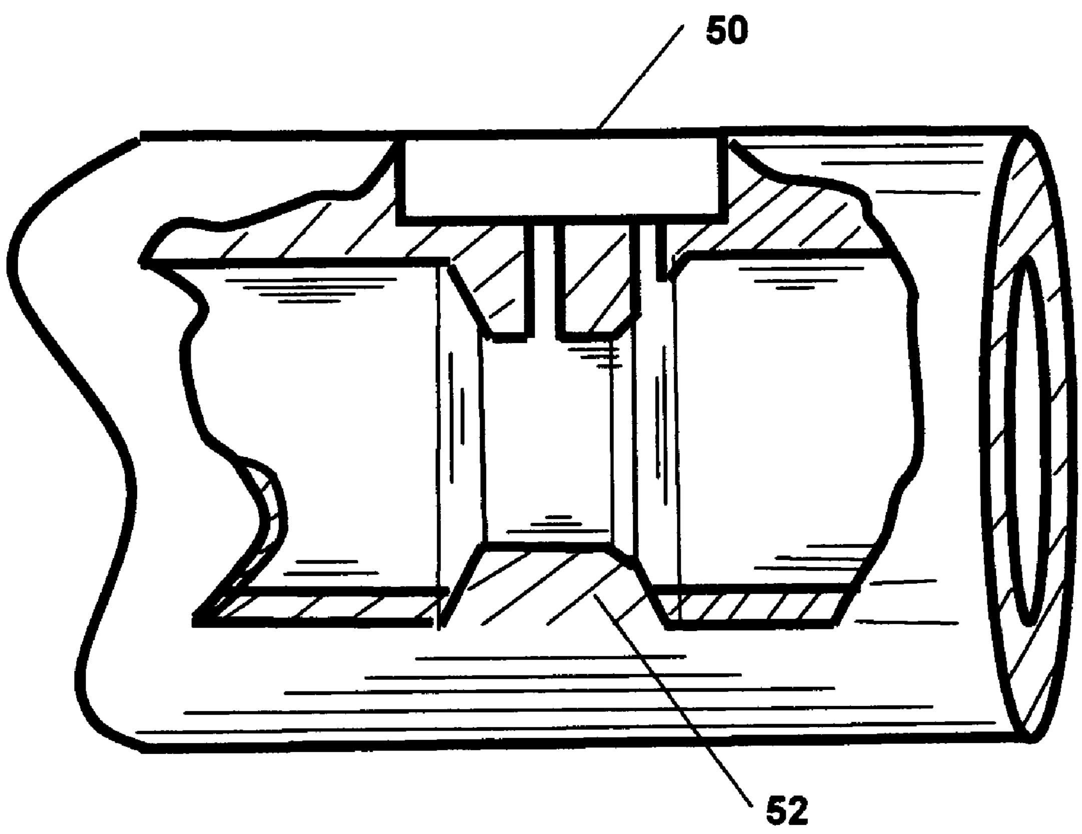
FIG. 6 is a schematic representation of the internal parts of one possible way a digital flow meter might be constructed.

FIG. 6 presents a representation of a section view of the internal parts of one possible way a digital flow meter 46 device might be constructed. It includes a cutaway presentation of one concept for an electronic flow measurement. This device envisions employing a control module 50 similar in concept to that used in compact digital tire gauges. The venturi 52 internal gas passage design shown allows measuring the pressure differential which varies with flow. Since gas flow is measured infrequently a simple button 40 in FIG. 2 could be used to activate a battery powered module. This suggested design is not to imply that other means can not be incorporated to measure and display gas flow such as the use of a hot wire anemometer design, etc. It is also recognized that it is possible to place a thin protective cover over the digital flow meter 46 and or the button 40 in FIG. 2, that could be attached with specially keyed fasteners and protect these elements.

CONCLUSION, RAMIFICATION, AND SCOPE

The shielding gas saving system described reduces a major source of shielding gas waste in the MIG welding process. Once installed, it performs the gas saving function by employing a variable flow-control device inserted into the shielding gas delivery hose at a predetermined distance from the gas solenoid. The gas passage created by placing the variable flow-control device a predetermined distance from the gas solenoid limits the amount of extra shielding gas expelled at the weld start to that stored in that gas passage. This significantly reduces wasted gas at the weld start. Installation is very simple and can be accomplished on existing NEG systems by splicing the variable flow-control device into the shielding gas delivery hose. Any existing flow-control device in the system need only be adjusted to its maximum flow or at least above the flow level which will be established by the variable flow-control device newly inserted. If a flow measuring rotameter device is present in the system near the gas supply it will read accurately even through gas flow is now controlled at the newly installed variable flow-control device. Alternately, for new installations, particularly those using pipeline gas supply the shielding gas delivery hose can be attached to the pipeline without the need for a regulator or other flow control device. Gas flow can be measured with a portable gas flow rotameter connected to the torch nozzle while the shielding gas solenoid in activated but with the welding wire disengaged from feeding.

The variable flow-control device can also be combined with a compact and rugged digital electronic flow meter so it can also be inserted in the shielding gas delivery hose. By being of a compact and rugged design the electronic flow meter can operate satisfactorily when subjected to the abuse of being dragged over the workplace while the wire feeder is moved to new locations. Alternately the variable flow-control device can be combined with a surge flow restricting orifice placed at the solenoid end of the newly formed gas passage. This flow restrictor is sized to limit the peak flow of shielding gas at the weld start but is sufficiently large as not to limit steady state flow while welding.

The combination of the variable flow-control device, digital electronic flow meter, and the flow restriction provides the functions of reducing shielding gas waste, reducing gas surge at the weld start and a rugged means of measuring gas flow.

Compared to devices that have been proposed to accomplish gas waste reduction this system is compact, can be installed on even long gas delivery hose lengths, maintains the self compensating flow control of higher gas pressure systems, and provides a controlled amount of extra gas at the weld start to displace air in the torch and weld area. Some simple low pressure devices have been employed to reduce gas waste, however, they provide no extra shielding gas at the weld start causing porosity and/or do not compensate for restrictions in the delivery hose or torch causing variations in shielding gas flow while welding.

I claim:

1. An apparatus having a variable flow-control device incorporated as one element in a metal inert gas welding system that includes a shielding gas delivery hose transporting shielding gas from a shielding gas source to a mechanism incorporating a gas solenoid or similar off-on device and a welding torch having a shielding gas nozzle; wherein said apparatus comprises:

a) said variable flow-control device is inserted in said shielding gas delivery hose which is greater than about 5 m (15 feet) in length creating two gas passages, one closest to said solenoid end and one closest to said shielding gas supply end, and b) said variable flow-control device controls the rate of flow of the shielding gas from said shielding gas source to said gas solenoid, and c) is of a design such that, when welding is stopped and thereby said solenoid blocks the flow of the shielding gas, said variable flow-control device allows the gas pressure in said gas passage closest to said solenoid end to essentially equalize with the higher gas pressure in said gas passage closest to said shielding gas supply end, and d) said variable flow-control device is located such that said gas passage at said solenoid end, when welding is stopped, contains a predetermined amount of the shielding gas, now stored at the higher pressure, that is sufficient to supply an extra amount of the shielding gas at the weld start to displace air that enters said welding torch and said shielding gas nozzle when welding is stopped in addition to supplying an extra amount of the shielding gas at the weld start to displace air in the weld start area.

2. The apparatus of claim 1, wherein said variable flow-control device is located a distance from said solenoid end of said shielding gas delivery hose such that said gas passage between said variable flow-control device and said solenoid has a volume of between about 0.017 liter (1 cubic inch) to 0.084 liter (5 cubic inches).

3. The apparatus of claim 1 having said variable flow-control device, further including an electronic flow measuring device which displays shielding gas flow continually or when activated by a switching means with said flow measuring device being co-located with said variable flow-control device or separately near the solenoid end of the gas passage connecting said variable flow-control device and said solenoid.

4. The apparatus of claim 1 having said variable flow-control device, further including an electronic flow measuring device which displays shielding gas flow continually or when activated by a switching means with said flow measuring device being co-located with said variable flow-control device or separately near the solenoid end of the gas passage connecting said variable flow-control device and said solenoid.

5. An apparatus having a variable flow-control device incorporated as one element in a metal inert gas welding system that includes a shielding gas delivery hose transporting shielding gas from a shielding gas source to a mechanism incorporating a gas solenoid or similar off-on device and a welding torch having a shielding gas nozzle; wherein said apparatus comprises:

a) said variable flow-control device is inserted in said shielding gas delivery hose which is greater than about 5 m (15 feet) in length creating two gas passages, one closest to said solenoid end and one closest to said shielding gas supply end, and b) said variable flow-control device controls the rate of flow of said shielding gas from said shielding gas source to said gas solenoid, and c) a design such that, when welding is stopped and thereby said solenoid blocks the flow of said shielding gas, said variable flow-control device allows the gas pressure in said gas passage closest to said solenoid end to essentially equalize with the higher gas pressure in said gas passage closest to said shielding gas supply end, and d) said variable flow-control device is located such that said gas passage at said solenoid end, when welding is stopped, contains a predetermined amount of the shielding gas, now stored at the higher pressure, that is sufficient to supply an extra amount of the shielding gas at the weld start to displace air that enters said welding torch and said shielding gas nozzle when welding is stopped in addition to supplying an extra amount of the shielding gas at the weld start to displace air in the weld start area, e) The apparatus having said variable flow-control device incorporates at the solenoid end of said gas passage closest to said solenoid end a gas surge limiting flow-restricting orifice or a small internal diameter hose connection device whereby shielding gas flow rate at weld initiation is limited but not controlling the steady state flow while welding.

6. The apparatus having said variable flow-control device and gas flow surge limiting restriction orifice defined in claim 5 further including an electronic flow measuring device which displays shielding gas flow continually or when activated by a switching means with said flow measuring device being co-located with said variable flow-control device or separately near the solenoid end of the gas passage connecting said variable flow-control device and said solenoid with said gas surge limiting flow-restricting orifice.

7. The apparatus having said variable flow-control device and gas flow surge limiting restriction orifice defined in claim 5 wherein said surge limiting flow-restricting orifice is between about 1 mm (0.040 inches) and 1.5 mm (0.060 inches) in diameter.

8. The apparatus having said variable flow-control device and gas flow surge limiting restriction orifice defined in claim 7 further including an electronic flow measuring device which displays shielding gas flow continually or when activated by a switching means with said flow measuring device being co-located with said variable flow-control device or separately near the solenoid end of the gas-passage connecting said variable flow-control device and said solenoid with said gas surge limiting flow-restricting orifice.

* * * * *